No. 755,123. PATENTED MAR. 22, 1904.
C. J. T. FLYGARE.
BAKING APPARATUS.
APPLICATION FILED JULY 24, 1903.
NO MODEL.
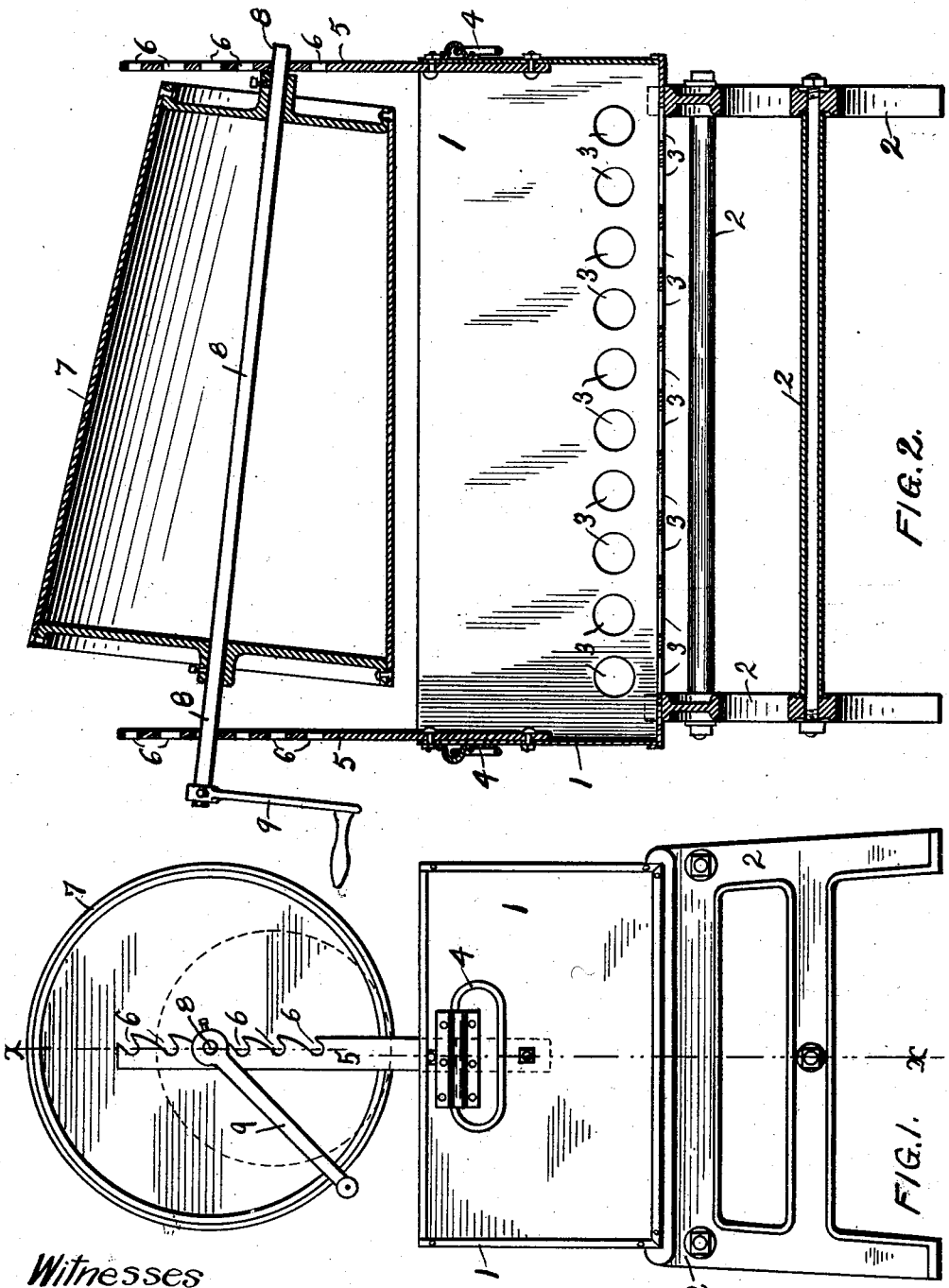
Witnesses
E. G. Haude
R. Berg.
Inventor
Christine J. T. Flygare
By Chas. A. Cairns
attorney No. 755,123. Patented March 22, 1904.

UNITED STATES PATENT OFFICE.

CHRISTINE J. T. FLYGARE, OF MINNEAPOLIS, MINNESOTA.

BAKING APPARATUS.

SPECIFICATION forming part of Letters Patent No. 755,123, dated March 22, 1904.

Application filed July 24, 1903. Serial No. 166,923. (No model.)

*To all whom it may concern:*

Be it known that I, CHRISTINE J. T. FLYGARE, a subject of the King of Sweden and Norway, residing at Minneapolis, in the county of Hennepin and State of Minnesota, (and whose post-office address is No. 45 South Third street, Minneapolis, Minnesota,) have invented a new and useful Improvement in Baking Apparatus, of which the following is a specification.

My invention relates to improvements in baking apparatus wherein that portion of the apparatus which receives and holds the material to be cooked or baked is made to revolve or turn over the fire; and the object of my improvement is to present appliances designed to produce fancy baking or the making of fancy pastry. I attain these objects by the mechanism shown in the accompanying drawings, in which—

Figure 1 is an elevation of my apparatus viewing the same from one end thereof; and Fig. 2 is a vertical section of the same through the line *x x*, Fig. 1.

Similar numerals refer to similar parts throughout both views.

The fire receptacle or box 1 may be supported upon any suitable base, such as that shown in the drawings and designated 2. The fire-box 1 is provided with air-holes or perforations 3 at and near the bottom thereof and for convenience of lifting and removal may also be provided with handles 4. Two standards 5 are secured at either end of the fire-box 1 and project above the same, these standards being provided at their outer ends with notches 6. A drum 7 is mounted at its axis upon a shaft 8, which is provided at one end with a hand-crank 9. The drum 7 should be tapering, or larger at one end than at the other, and may be in the form of a cone; but I prefer to make the same in the form of a frustum of a cone and hollow within, as shown in the drawings. This drum will be supported over the fire-box 1 upon the standards 6 by means of a shaft 8, resting within the notches 6, or by other suitable means providing bearings whereby the drum may be supported at its axis above the fire-box, so as to be capable of being revolved in that position.

The operation of my baking apparatus is as follows: Fire is provided within the fire-box 1 by the use of suitable material, such as charcoal or gas, and the drum 7 is revolved by the hand by means of crank 9. While the drum is being heated the material is applied and the baking accomplished. The material to be baked is prepared in the form of a batter and is poured or spread upon the drum 7 while in a plastic state, the drum being at the time revolved. The result is that irregular protuberances are formed upon the outer surface of the material being baked, giving the same a fanciful shape and rendering the same highly artistic and decorative. The drum is slowly turned until the material is properly baked. Then the drum is removed from the fire by lifting it out of the notches in the standards and the product removed from the drum over the smaller end thereof. The drum may be adjusted nearer to the fire or away therefrom, as desired, by means of the series of notches 6, provided in the standards 5.

What I claim as new, and desire to secure by Letters Patent, is—

1. In a baking apparatus, the combination of a fire-receptacle, a drum which is smaller at one end than at the other and is adapted to receive upon its outer surface the material to be baked, means for supporting said drum above the fire-receptacle, and means adapting the drum to be revolved upon its axis in that position, substantially as shown and described.

2. In a baking apparatus, the combination of a fire-receptacle, a tapering drum adapted to receive upon its outer surface the material to be baked, means for adjustably and removably supporting said drum above the fire-receptacle and at the axis of the drum, said drum being adapted to be revolved about said axis, substantially as specified.

3. In a baking apparatus, the combination of the fire-box 1, the standards 5 provided with the notches 6, the drum 7 adapted to receive upon its outer surface the material to be baked, the shaft 8, and the crank 9 substantially as herein set forth.

CHRISTINE J. T. FLYGARE.

Witnesses:
 CHAS. S. CAIRNS,
 R. BERG.